United States Patent [19]

Berg

[11] Patent Number: 4,741,659
[45] Date of Patent: May 3, 1988

[54] POWERED DRUM LIFTING TRUCK

[75] Inventor: Bruce A. Berg, Lake Forest, Ill.

[73] Assignee: Liftomatic Material Handling, Inc., Evanston, Ill.

[21] Appl. No.: 847,534

[22] Filed: Apr. 3, 1986

[51] Int. Cl.⁴ .............................................. B66F 9/00
[52] U.S. Cl. ................................ 414/450; 294/90; 414/490; 414/622
[58] Field of Search .................. 414/450-456, 414/490, 622, 621; 294/90

[56] References Cited

U.S. PATENT DOCUMENTS

| | | | |
|---|---|---|---|
| 460,250 | 9/1891 | Junkins | 414/455 |
| 2,160,041 | 5/1939 | Sooter | 414/454 |
| 2,272,447 | 2/1942 | Traxel | 414/450 |
| 2,360,858 | 10/1944 | Ernst | 414/622 |
| 2,635,775 | 4/1953 | Ernst | 414/622 |
| 2,673,654 | 3/1954 | Kaufman | 414/450 |
| 2,693,289 | 11/1954 | Ulinski | 414/450 X |
| 2,698,107 | 12/1954 | Ericson | 414/621 |
| 2,814,403 | 11/1957 | Ericson | 414/622 |
| 2,895,567 | 7/1959 | Hall | 187/9 R |
| 2,905,347 | 9/1959 | Hopfeld | 414/622 |
| 3,278,218 | 10/1966 | Lèbre | 414/451 X |
| 3,815,767 | 6/1974 | Lund et al. | 414/456 |
| 3,907,138 | 9/1975 | Rhodes | 414/490 X |
| 4,114,771 | 9/1978 | Heuckroth | 414/450 X |
| 4,130,212 | 12/1978 | Gatilao | 414/622 X |
| 4,257,729 | 3/1981 | Morissette | 414/490 |

FOREIGN PATENT DOCUMENTS 2069454 8/1981 United Kingdom ................. 414/454

OTHER PUBLICATIONS

Saginaw Steering Gear Company Catalog pp. 25-30, on HiTec Linear Actuators, undated.

Primary Examiner—Joseph E. Valenza
Assistant Examiner—David A. Bucci
Attorney, Agent, or Firm—Hill, Van Santen, Steadman & Simpson

[57] ABSTRACT

A two-wheeled drum or barrel transporting truck slidably mounts a drum flange or chime clamp which is powered from an energy source on the truck to raise the drum for depositing the same on a pallet or the like. An electric motor driven linear actuator on the truck is energized from a battery also carried on the truck to drive the clamp. A double pole switch on or adjacent the handlebar of the truck controls a circuit to drive the motor in opposite directions. The clamp when raised against the chime ring of a barrel or drum automatically locks the drum to the truck. Rollers on the truck embrace and cradle the drum so that it is easily raised and lowered on the truck.

4 Claims, 4 Drawing Sheets

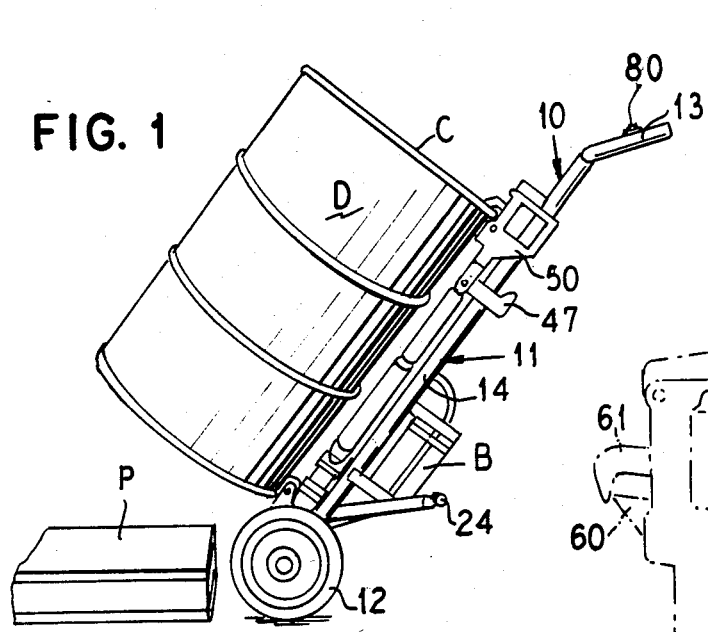
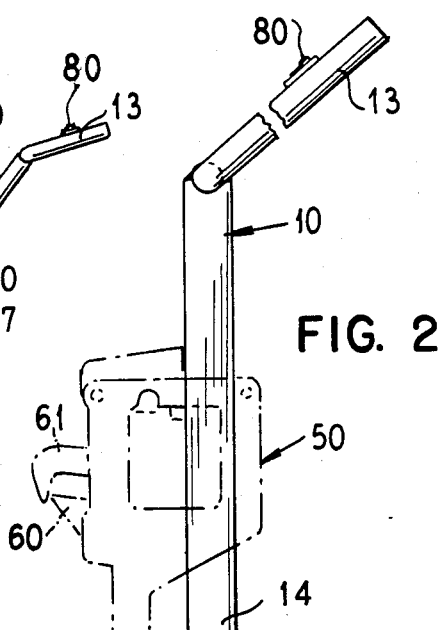
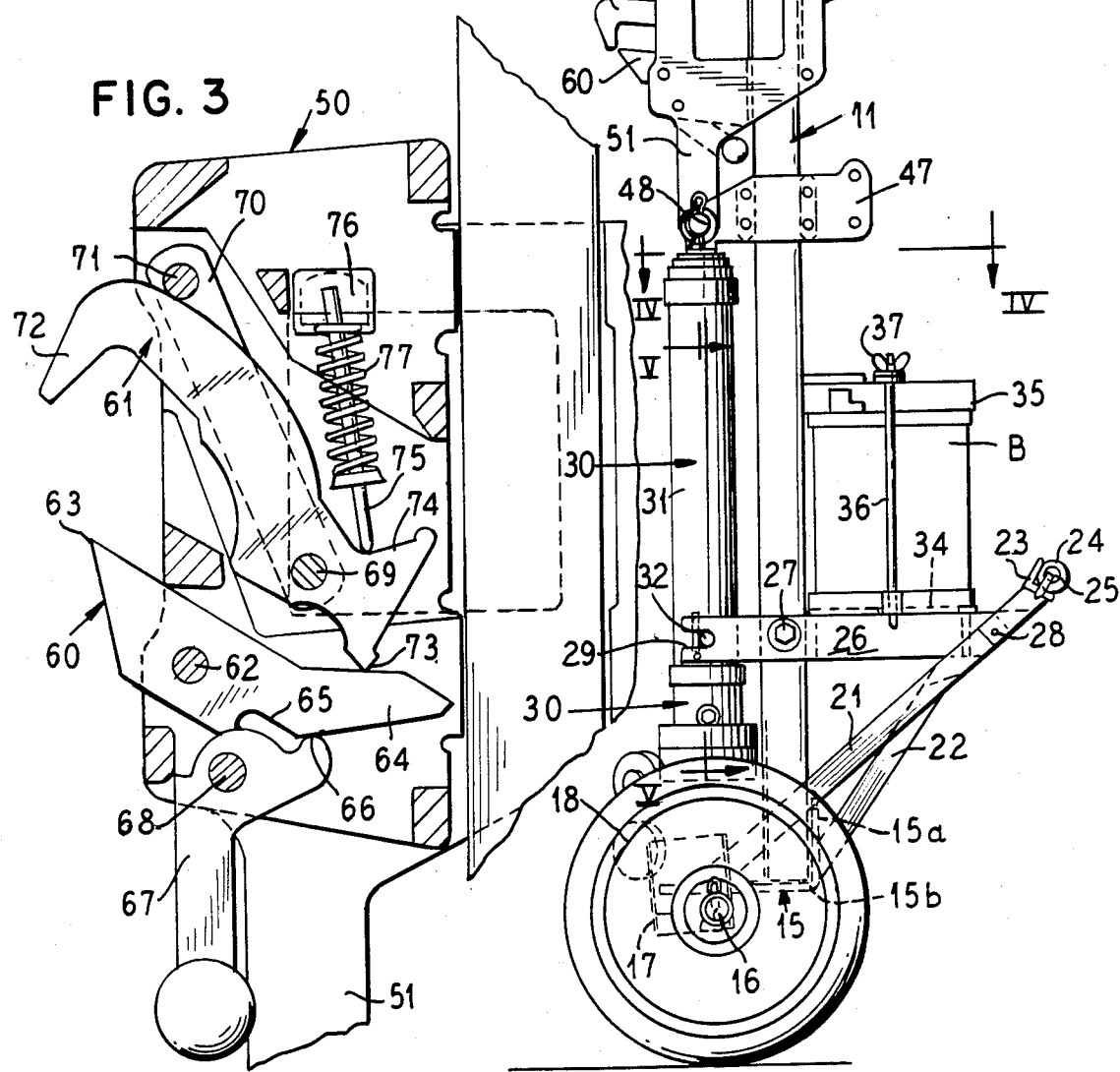

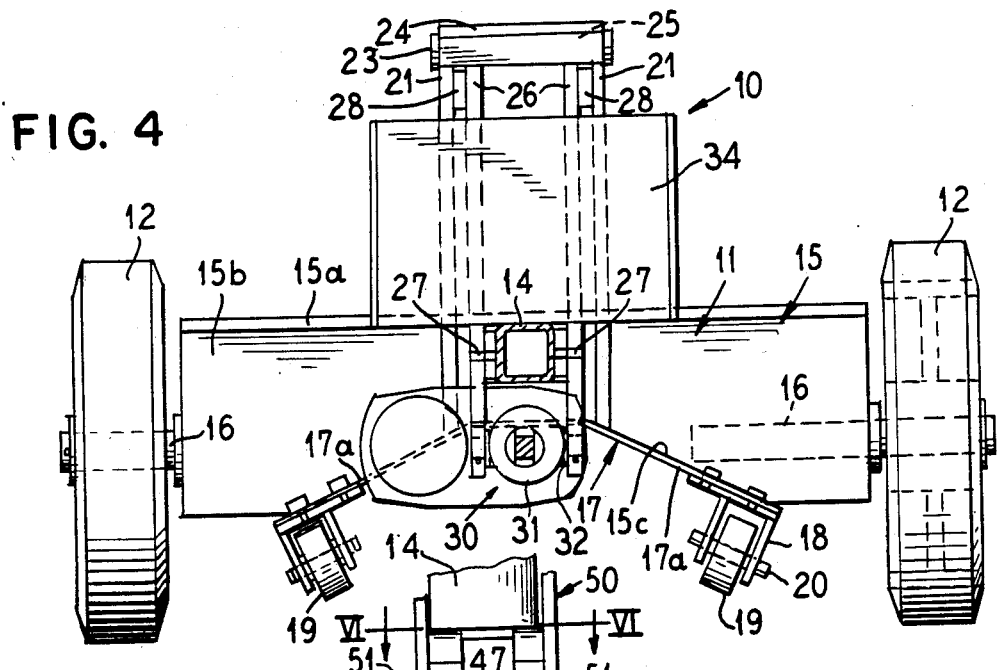

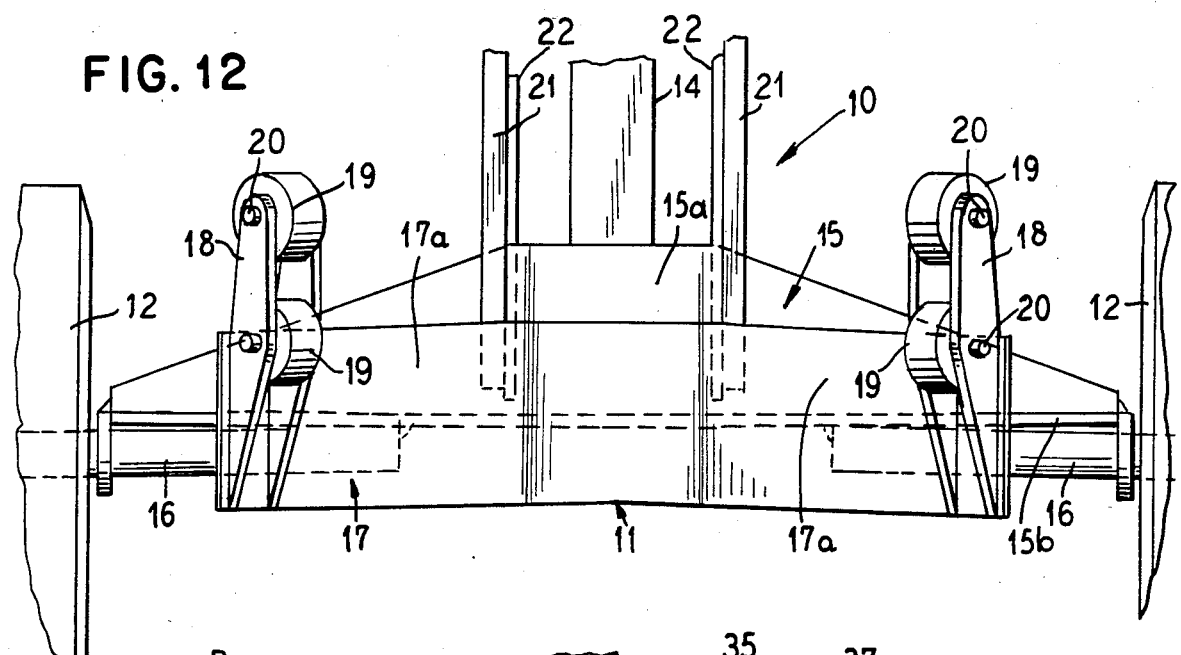
FIG. 12
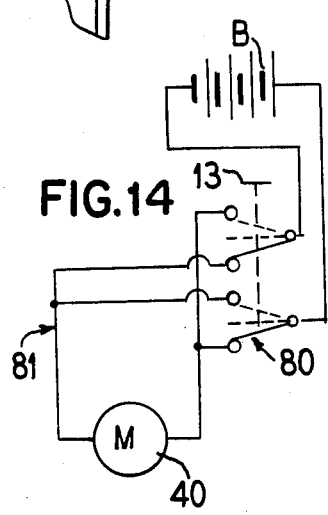
FIG. 14
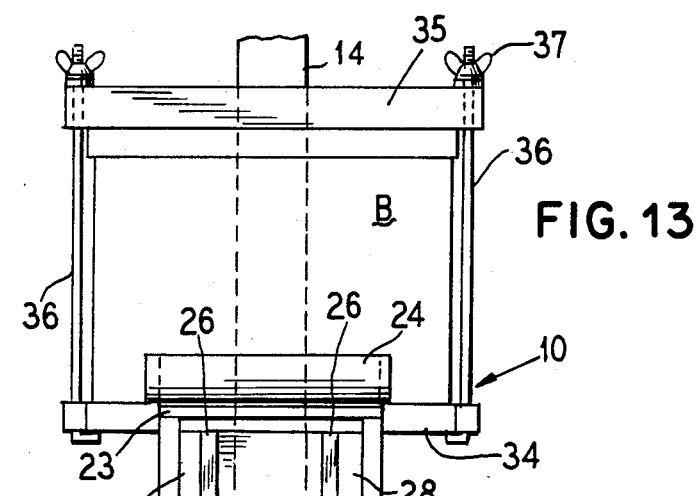
FIG. 13
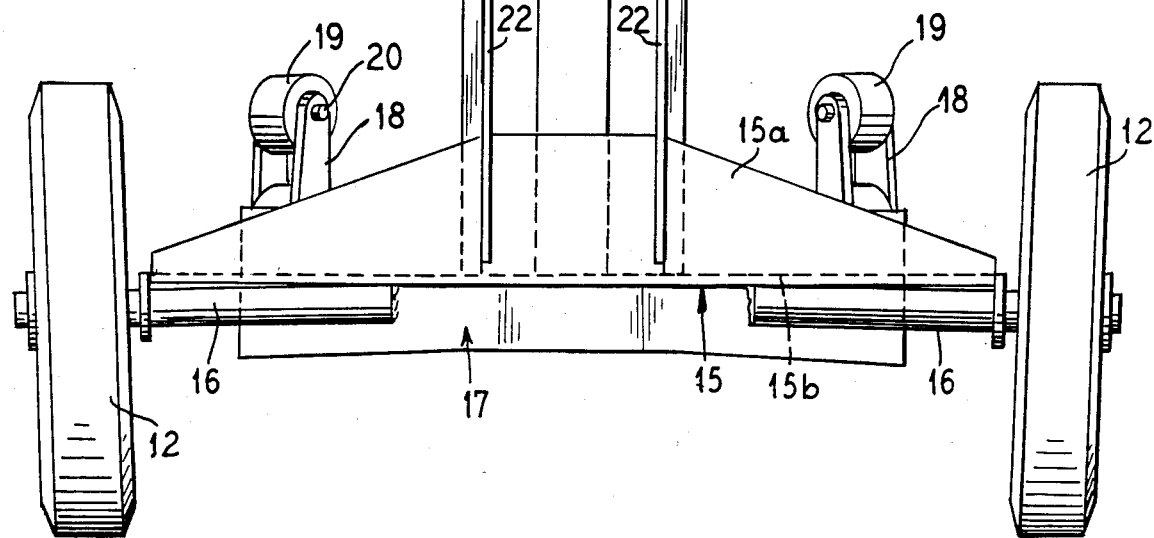

4,741,659

POWERED DRUM LIFTING TRUCK

FIELD OF THE INVENTION

This invention relates to the art of hand operated two-wheeled drum trucks and specifically relates to such trucks equipped with power mechanism to raise and lower a drum thereon for facilitating depositing the drum on a raised pallet or the like.

THE PRIOR ART

Hand operated two-wheeled drum trucks with gripping jaws engaging the bead or top chime of a drum are known in the art, but can only tilt the drum off of the ground for transport. The wheels provide the tilting fulcrum and even when the drum is inclined in a maximum transporting angle its bottom rear portion cannot clear a raised pallet or the like and the drum must be tilted over the edge of the pallet, released from the truck, and rocked into position on the pallet. It would be an improvement in this art to provide a drum truck which raises the drum to a desired height for depositing on pallets or the like raised supports. It would be a further improvement in this art to raise the drum on the truck by means energized from a battery carried on the truck. This invention now provides these improvements.

SUMMARY

According to this invention there is now provided a hand operated two-wheeled drum truck carrying its own power means to raise and lower the drum on the truck. The truck has a transversely extending bottom frame mounting laterally spaced wheels and having a central elongated upright bar or beam with a handle on its upper end. Rollers on the frame embrace and cradle a drum to be mounted thereon. The rollers rotate on horizontal axes so that the drum may be moved longitudinally on the frame. The upright frame bar slidably mounts a clamp with gripping jaws engaging the upward chime ring or bead of a drum cradled by the rollers. An electric motor driven linear actuator is mounted on the frame in front of the upright bar and is coupled to the clamp to raise and lower it along the length of the bar. An electric battery is mounted behind the upright bar to energize the actuator and a switch is provided at the handle for actuating the motor in opposite directions to selectively raise and lower the clamp. A foot step is provided at the rear of the frame to be pressed by the foot of the operator for tilting the frame about the wheels.

The truck is pushed in a vertically upright position against the side of a drum to be transported with the rollers embracing the drum. The actuator is energized through the switch to position the clamp at a level so that its jaws embrace the top chime or bead of the drum. The clamp is then further raised to trigger the jaws into locked engagement with the chime or bead, the frame is tilted by the operator, the switch is again manually operated to raise the drum to a desired height on the truck, the truck is wheeled to the location for depositing the drum, such as on a pallet, the frame is then again tilted to an upright position with the drum clearing the pallet, the clamp is then lowered to deposit the drum on the pallet and the jaws are released from the chime whereby the truck is freed to be moved away from the pallet.

It is then an object of this invention to provide a two-wheeled hand operated drum truck or dolly which is powered to raise and lower the drum on the truck to facilitate receiving a drum at one level and depositing it at another level.

Another object of the invention is to provide a two-wheeled drum dolly which cradles a drum for longitudinal movement and carries power means to cause such movement.

Another object of this invention is to provide a drum truck with a drum chime engaging clamp that is raised and lowered by power means on the truck.

A specific object of the invention is to provide a two-wheeled hand operated drum truck with a battery, an electric motor driven linear actuator and a drum chime clamp driven by the actuator automatically locking a drum on the truck.

Other and further objects of this invention will become apparent to those skilled in this art from the following detailed description of the annexed sheets of drawings which, illustrate a best mode embodiment of the invention.

FIG. 1 is a perspective view of a two-wheeled drum truck of this invention showing the drum in raised position approaching a pallet to receive the drum.

FIG. 2 is a side elevational view of the drum truck of this invention illustrating in dotted lines a raised position of the drum clamp.

FIG. 3 is an enlarged broken vertical sectional view with parts in side elevation of the drum clamp in opened position.

FIG. 4 is a horizontal sectional view along the line IV—IV of FIG. 2.

FIG. 5 is a vertical sectional view, with parts in elevation, along the line V—V of FIG. 2.

FIG. 6 is a horizontal sectional view taken along the line VI—VI of FIG. 5.

FIG. 8 is a cross-sectional view along the line VIII—VIII of FIG. 7 with parts in elevation.

FIG. 12 is a fragmentary front elevational view of the lower portion of the truck.

FIG. 13 is a rear elevational view of the lower portion of the truck.

FIG. 14 is a diagram of the energizing circuit.

AS SHOWN ON THE DRAWINGS

Figure 7:
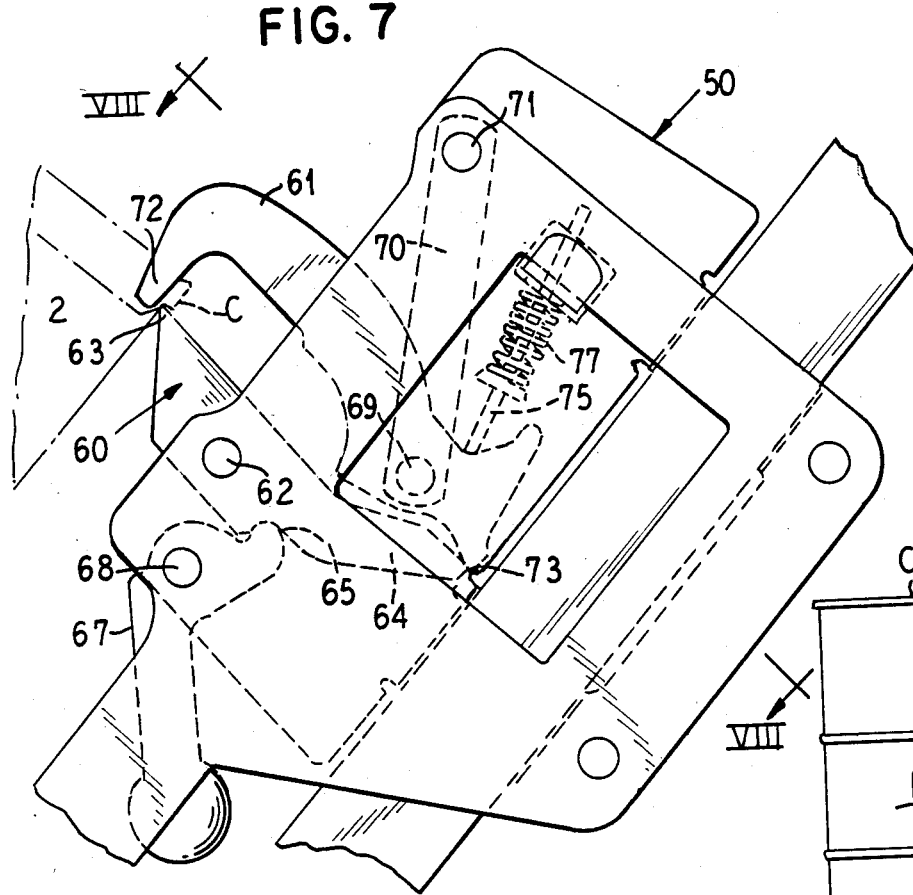
FIG. 7 is an enlarged broken side elevational view of the clamp of FIG. 3 in closed position.

In FIG. 1 the drum truck 10 is illustrated in inclined position carrying a drum D in elevated position and approaching a pallet P to deposit the drum thereon.

As shown in FIGS. 1, 2, 4, 12 and 13, the truck 10 has a main frame 11 with laterally spaced wheels 12 on the bottom end thereof and a handle bar 13 on the top end thereof.

The frame 11 includes a central upright square tube bar or beam 14 having the upstanding leg 15a of a transverse angle plate welded to the bottom portion thereof. The plate 15 has a forwardly projecting horizontal leg 15b providing a platform carrying axles 16 which are welded to the underface of the outboard end portions of the leg 15b and project laterally therefrom in slightly downwardly inclined position to mount the wheels 12 at a camber angle for ease in tracking.

The forward edge of the platform leg 15b has a notch or recess 15c in the midsection thereof with a bottom or inner end parallel to the upstanding flange 15a and diagonal sidewalls extending from this bottom to the forward edge of the platform leg.

An upstanding plate 17 fitting this notch or recess is welded to the leg 15b and has angled upright wings 17a to which are bolted upright brackets 18, each rotatably mounting a pair of superimposed rollers 19 on horizontal axles 20. Since the wings 17a of the upright plate 17 are laterally inclined and since the brackets 18 are bolted to these wings, the rollers 19 converge toward each other and the angles of conversion are such as to intersect at the axis of a standard size 50-gallon drum cradled on the rollers. The angle of conversion is thus such as to cause the rollers to cradle the periphery of the drum and, of course, drums having diameters greater or less than a standard 50-gallon drum will still be amply cradled by the rollers. Since the rollers rotate on horizontal axes, the drum is supported for longitudinal movement on the truck.

A pair of spaced parallel straps 21 are welded at their forward ends to the platform leg 15b of the angle plate 15 and inclined upwardly and rearwardly therefrom over the vertical leg of the plate to which they can also be tack welded. The angle of inclination is about 45° from the leg 15b.

A pair of rigidifying strut straps 22 have forward ends welded to the upstanding leg 15a of the angle plate 15 and rearward ends welded to the straps 21 forwardly from the rear ends of these straps.

The rear ends of the straps 21 are connected by an angle iron crossbar 23 and a hollow rubber or plastic tube 24 is cradled in this angle bar 23 and mounted on an axle bolt 25 secured to the angle iron. This tube 24 provides a step conveniently pressed or pushed by the foot of an operator for tilting the frame 11 of the truck about the axis provided by the axles 16 of the wheels 12 to easily incline the truck from an upright vertical position to an inclined traveling position.

A pair of frame strips 26 are bolted intermediate with their ends to the side faces of the upright beam bar 14 as shown at 27 and project horizontally both forwardly and rearwardly of the beam 14 with their rear ends pinned at 28 to the straps 21. The forward ends of the members 26 are horizontally bifurcated as indicated at 29.

An electric motor driven nut linear actuator unit 30 has an upright tubular casing 31 with laterally projecting trunnions 32 received in the yokes 29 and held therein by bolts 33. The unit 30 is thus mounted forwardly of the beam bar 14 above the platform 15b of the angle frame 15.

A support plate 34 for an electric battery B is mounted on top of the frame members 26 between the beam 14 and the rear ends of the straps 21. The battery B rests on the plate 34. A frame 35 embraces the top of the battery B and bolts 36 straddle the battery and have bottom ends secured in the plate 34 and top ends slidably receiving the frame 35 with wing nuts 37 threaded thereon to clamp the battery between the bottom plate 34 and the frame 35.

As shown in FIG. 5, the actuator unit 30 has a bottom casing 38 on the bottom of the frame tube 31 housing gearing connecting the drive shaft 39 of an electric motor 40 mounted upright on the casing through a slip clutch 41 with a driven shaft 42 into an upright ball screw assembly 43. A conventional ball nut 44 on this screw 43 traverses the length of the screw to raise and lower a cylinder 45 telescoped in the tubular casing 31. A brake assembly 46 is provided to lock the screw 43 in fixed position when the motor 40 is deenergized.

A slide bracket 47 (FIG. 2) rides on the bar beam 14 and mounts a transverse pin 48 extending through a lug 49 on top of the cylinder 45. A latch frame 50 slidable on the bar beam 14 above the bracket 47 has dependent fingers 51 straddling the bracket 47 and also pinned to the pin 48.

The latch frame 50 houses a pair of barrel chime engaging pivoted jaws 60 and 61 shown in FIGS. 3 and 7. The bottom jaw 60 pivots on a pin 62 supported by the frame 50 and has a pointed chime engaging edge 63 projecting from the frame and a tail 64 in the frame. The bottom face of the tail 64 has a notch 65 into and out of which rides the nose 66 of a gravity actuated weight 67 pivoted at 68. The top jaw 61 is pivoted on a pin 69 carried by straddling straps 70 which are pinned at 71 to the upper end portion of the frame 50.

The forward end of the jaw 61 has a hook portion 72 for projecting into the periphery of an exposed top chime on the drum. The tail end of the jaw 61 has a bottom edge 73 riding on the tail 64 of the jaw 60 and a top edge 74 pressed by a spring-loaded pin 75 to maintain contact between the edge 73 and the tail 64. This pin 75 rides in a housing 76 in the frame 50 and is free to tilt with the spring 77 embracing the pin being compressed to load it against the top edge 74 of the jaw 61. The clamp arrangement is such that when the pointed end 63 of the lower jaw 60 engages the bottom of a drum flange or chime ring C, as illustrated in FIG. 7, and is depressed thereby, the tail end 64 thereof will swing upwardly causing the edge 73 of the jaw 61 to swing upwardly, thereby pivoting the jaw 61 on the strap 70 and depressing its hook nose 72 into the inner periphery of this chime ring C and clamping the jaw to the drum. As the bottom jaw 60 swings downwardly the nose of the weight member 67 will ride into the notch 65, thereby locking the jaws in their clamped position.

As illustrated in FIG. 14, a double pole switch 80 mounted on the handlebar 13 of the truck frame controls a circuit 81 between the battery B and the reversible motor 40 of the actuator assembly 30. This switch 80, convenient to the hands of an operator grasping the handlebar 13, is activated in opposite directions to cause the motor 40 to raise or lower the clamp 50.

Figure 9:
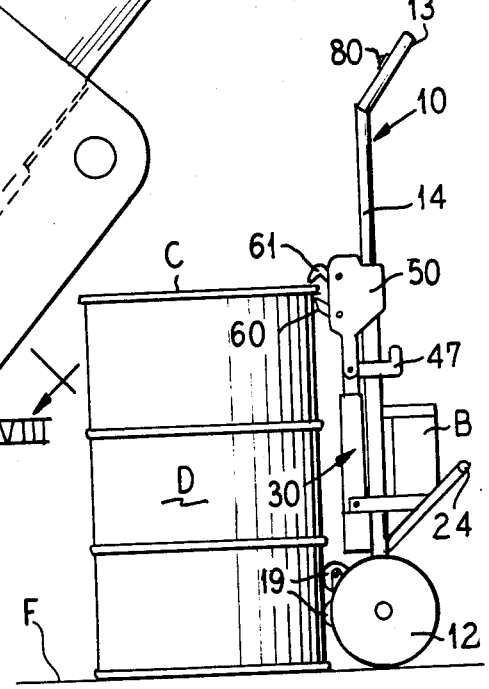
FIG. 9 is a side elevational view of the truck in position for receiving a drum.

As shown in FIG. 9, a drum D resting on a floor F and having a top chime ring C is approached by the truck 10 in an upright position with the cradling rollers 19 projecting forwardly of the wheels 12 being pushed against the lower portion of the drum. The switch 80 is activated to move the clamp 50 to a level on the frame beam 14, such that the jaws 60 and 61 straddle the chime ring C.

Figure 10:
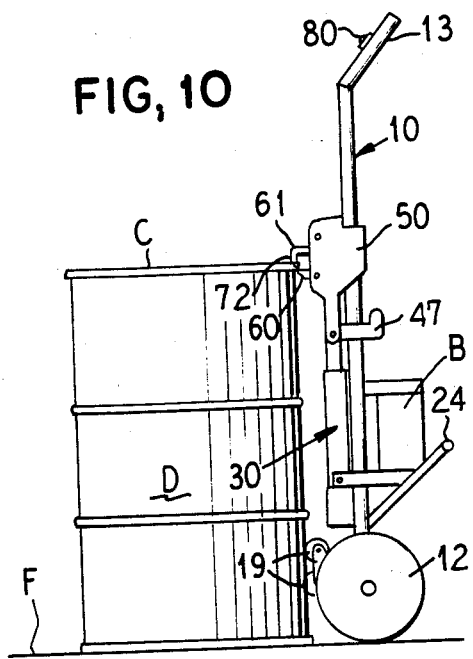
FIG. 10 is a view similar to FIG. 9, but illustrating the raised position of the clamp locked to the top chime ring or bead of the drum.

Then, as shown in FIG. 10, the switch 80 is again manipulated by the operator to further raise the clamp 50 forcing the lower jaw 60 against the bottom of the exposed chime ring C and automatically triggering the top jaw 61 so that its hook portion 72 enters the inner periphery of this chime ring and the downward swinging of the pointed end 63 of the jaw 60 raises its tail 64 so that the weight block 67 will enter the notch 65, thereby locking the jaws in their chime ring clamping position as shown in FIG. 7. Next, the operator conveniently presses down on the step 24 tilting the truck to a transporting position as illustrated in FIG. 1, whereupon further raising of the clamp assembly 50 lifts the drum to an elevated position above the wheels 12.

Figure 11:
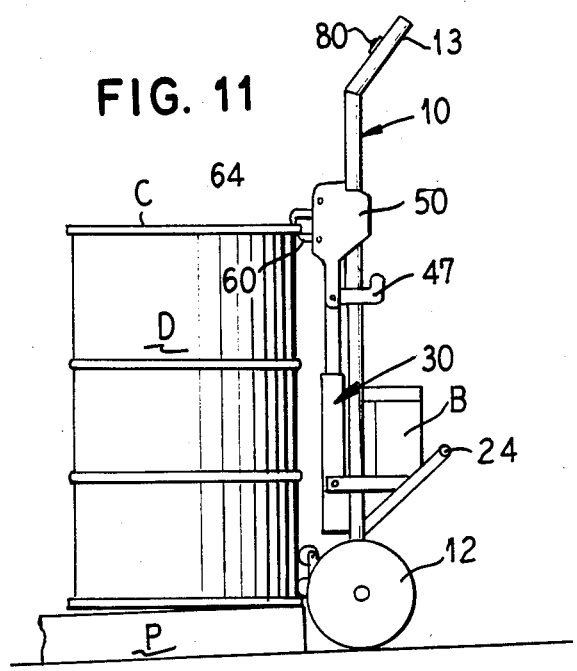
FIG. 11 is a view similar to FIG. 10, but illustrating the truck tilted upright from the position of FIG. 1 and depositing the drum on the pallet.

The drum on the tilted truck is easily transported to a pallet P with the drum at a level clearing the top of the pallet. The truck is then conveniently tilted back to an upright position, shown in FIG. 11, with the drum over the pallet, whereupon the clamp 50 is lowered by again activating the actuator 30, thus depositing the drum on the pallet.

The weight block 67 is then released from the notch 65 permitting the jaws to separate and freeing them from the chime C.

From the above descriptions it will therefore be clear to those skilled in this art that the drum trucks of this invention are powered from an energy source on the truck to manipulate a drum chime clamp locking the drum to the truck and raising it to a desired level for convenience in depositing the drum on a pallet or the like.

It will be understood that variations and modifications may be effected without departing from the spirit and scope of the novel concepts of the present invention.

I claim as my invention:

1. A hand operated tiltable two-wheeled drum lifting and conveying truck which comprises a frame having an upright central bar, handle means on the upper end of the bar, a transverse base on the lower end of the bar, a pair of transversely spaced coaxial wheels rotatably mounted on the base for supporting the base above ground level and for tilting the base about the wheel axis, cradle means supported by the base projecting forwardly therefrom inboard from the wheels for cradling a drum forwardly of the wheels unencumbered by any truck structure, a self-actuating drum chime ring clamp slidably mounted on said bar between said base and handle, an electric motor driven linear actuator mounted forwardly of said bar, and substantially behind the cradle means for raising and lowering said clamp on the bar, a horizontal foot step carried by said base spaced rearwardly behind said bar constructed and arranged to be depressed for tilting the truck together with a drum cradled thereon about the wheel axis for inclining the truck and drum to a transport position, a battery mounted on the truck between the horizontal foot step and bar, a switch mounted on the handle means, a circuit including the battery, switch, and electric motor of the actuator for driving the motor in opposite directions for raising and lowering the clamp on the bar, said clamp having chime ring engaging jaws to straddle and then clamp the chime ring of a drum cradled on the truck whereby the truck is adaped to be rolled on said wheels in an upright position to engage the cradle means with the side of the upright drum, the clamp driven to a level on the bar to straddle the top chime ring of the drum with the jaws, the clamp then driven to a higher level to lock the jaws to the chime ring and lift the drum and the horizontal step depressed by the foot of an operator grasping the handle to tilt the drum rearwardly about the axis of the wheels to an inclined transporting position with the drum sufficiently raised to clear the top of a pallet and then be deposited on the pallet by forward tilting of the truck about the axis of the wheels.

2. A two-wheeled tiltable drum handling truck for transporting and palletizing drums which comprises a frame having a transverse base, axle means mounted on and extending outwardly from each end of said transverse base, a pair of coaxially aligned wheels rotatably mounted on said axle means outwardly from said transverse base, drum cradling means supported from said base inwardly from said wheels, an upright bar mounted on said base centrally between the wheels and rearwardly from the drum cradle means, straps mounted on said base projecting rearwardly from said bar, a horizontal foot step mounted on said straps in spaced relation from said bar and above said base, a battery support mounted on said bar and said straps, a battery carried on said support rearwardly from said bar and forwardly of said foot step, a self-actuating drum chime ring clamp slidably mounted on said bar, an electric motor driven linear actuator mounted on the front of said bar and behind said drum cradling means and connected to said clamp for raising and lowering the clamp on the bar, handle means mounted on the top end of said bar and projecting therefrom to be grasped by an operator behind the truck for transporting the truck on the wheels and for tilting the truck about the axis of the wheels, a two-way electric switch mounted on the handle means, a circuit including the battery, the electric motor of the actuating means, and the switch for driving the actuator in opposite direction to raise and lower the clamp, and said cradling means projecting forwardly of the base and inboard from the wheels to position the major portion of a drum engaged by the cradling means forwardly of the wheels unencumbered by any truck structure.

3. A hand manipulated two-wheeled tiltable drum truck having a frame with a transverse base, wheels rotatably mounted on the base outboard from the ends of the base, a central upright bar mounted on the base midway between said wheels and rearwardly from the wheel axis, drum cradling means mounted on the base between the wheels to receive a drum unencumbered by the wheels, a handle on the top end of said bar, a horizontal foot step supported from said base in spaced relation rearwardly from said bar near the bottom thereof, a battery support mounted on and extending rearwardly from said bar and forwardly from said foot step, a battery clamped on top of said battery support means, a drum chime ring clamp slidably mounted on said bar, an electric motor driven worm gear drive mounted on the front of said bar and substantially behind said drum cradling means, means connecting said drive to said clamp for raising and lowering the clamp on the bar, a two-way electric switch mounted on said handle, a circuit including said switch, said battery, and said motor driven actuator for reversely driving the actuator to raise and lower the clamp, said truck adapted to be pushed in a horizontal upright position against a floor mounted drum with the cradle means embracing the drum and the clamp means engaging the top chime ring of the drum, said switch being actuated to secure the top chime ring to the clamp and to raise the drum off of the floor, said truck adapted to be tilted about the axis of the two wheels into an inclined transporting position with the drum raised to clear a pallet and the truck then tilted back to an upright position to deposit the drum on the pallet, and said clamp having release means for disengaging the drum on the pallet.

4. A hand pushed self-contained drum lifing and conveying truck tiltable on a pair of wheels from an upright drum receiving position to an inclined drum conveying position and then to an upright drum discharging position which comprises a transverse base having laterally projecting axles, a wheel rotatably mounted on each axle supporting the base above the ground and accommodating tilting of the base about the axis of the wheels from a vertical position to an inclined position, drum cradling means projecting forwardly of the base and positioned intermediate the wheels, an upright beam on the base rearwardly of the drum cradling means and midway between the wheels, a handle on the top end of the beam extending rearwardly to be grasped by an operator behind the truck, a drum clamp slidably mounted on the beam, an electric motor driven linear actuating device mounted on the front face of the beam and rearwardly of the drum cradling means and attached to said clamp for raising and lowering the clamp along the length of the beam, support means mounted on the base extending rearwardly therefrom beyond the beam, a horizontal foot step carried by said support means in spaced relation behind the beam, means for mounting an electric battery between the beam and horizontal step, a battery clamped on said support means, a two-way switch on the handle, an electrical circuit including said switch, said actuator, and said battery, for driving the electric motor to raise and lower the clamp, said truck adapted to be pushed in an upright position to engage the cradle with an upright floor mounted drum, said clamp adapted to engage the top chime ring of the drum for lifting the drum off of the floor, said step adapted to be depressed by the foot of an operator grasping the handle to tilt the truck rearwardly about the axis of the wheels to an inclined transporting position and said lifted drum on the truck adapted to be tilted over a raised pallet, swung to an upright position on the pallet and deposited thereon by forward tilting of the truck and operation of the switch to lower the clamp, and means for uncoupling the clamp from the drum.

\* \* \* \* \*